(12) United States Patent
Reimann et al.

(10) Patent No.: US 12,516,736 B2
(45) Date of Patent: Jan. 6, 2026

(54) ARRANGEMENT, SEALING AND METHOD FOR LIMITING THE INTRUSION OF PARTICLES INTO A GAP

(71) Applicant: HOCHSCULE FÜR ANGEWANDTE WISSENSCHAFTEN ANSBACH, Ansbach (DE)

(72) Inventors: Hans-Achim Reimann, Ansbach (DE); Philipp Hafner, Ansbach (DE)

(73) Assignees: Hans-Achim Reimann, Ansbach (DE); Philipp Hafner, Ansbach (DE)

( * ) Notice: Subject to any disclaimer, the term of this patent is extended or adjusted under 35 U.S.C. 154(b) by 48 days.

(21) Appl. No.: 18/293,665

(22) PCT Filed: Jun. 28, 2022

(86) PCT No.: PCT/EP2022/067811
§ 371 (c)(1),
(2) Date: Jan. 30, 2024

(87) PCT Pub. No.: WO2023/011808
PCT Pub. Date: Feb. 9, 2023

(65) Prior Publication Data
US 2025/0116335 A1    Apr. 10, 2025

(30) Foreign Application Priority Data

Aug. 2, 2021    (EP) ..................................... 21189072

(51) Int. Cl.
*F16J 15/32*    (2016.01)
*F16J 15/3288*    (2016.01)

(52) U.S. Cl.
CPC ................................. *F16J 15/3288* (2013.01)

(58) Field of Classification Search
CPC .................................................. F16J 15/3288
See application file for complete search history.

(56) References Cited

U.S. PATENT DOCUMENTS

| 3,799,634 | A | * | 3/1974 | Sernetz | F16C 33/7886 |
| | | | | | 277/423 |
| 3,801,113 | A | * | 4/1974 | Jackson | F16J 15/3244 |
| | | | | | 277/559 |
| 4,673,026 | A | * | 6/1987 | Hagar | F28D 19/047 |
| | | | | | 165/9 |
| 5,927,721 | A | * | 7/1999 | Schulze | F16J 15/3288 |
| | | | | | 277/355 |
| 5,950,707 | A | * | 9/1999 | Kozacka | F28D 17/023 |
| | | | | | 277/553 |

(Continued)

FOREIGN PATENT DOCUMENTS

| JP | 2017-067101 A | 4/2017 |
| JP | 2017-067102 A | 4/2017 |
| JP | 2018-204638 A | 12/2018 |

*Primary Examiner* — Vishal A Patel
(74) *Attorney, Agent, or Firm* — Workman Nydegger

(57) ABSTRACT

Provided are means for limiting the intrusion of particles into a gap formed between parts of a device which are to perform a periodic motion relative to each other when the device is in use. The means include an asymmetric structured surface which is configured to delimit the gap towards one of the parts and a flexible structure which is configured to be attached to the other part and to extend into the gap.

14 Claims, 8 Drawing Sheets

(56) References Cited

U.S. PATENT DOCUMENTS

| | | | | |
|---|---|---|---|---|
| 6,789,605 B1* | 9/2004 | Kaser | ............... | F23L 15/02 |
| | | | | 165/8 |
| 7,059,829 B2* | 6/2006 | Garner | ............... | F04D 29/083 |
| | | | | 277/433 |
| 9,133,940 B1* | 9/2015 | Taylor | ............... | F16J 15/164 |
| 9,200,527 B2* | 12/2015 | Hafner | ............... | F01D 11/001 |

* cited by examiner

ARRANGEMENT, SEALING AND METHOD FOR LIMITING THE INTRUSION OF PARTICLES INTO A GAP

FIELD

The present disclosure relates to limiting the intrusion of particles into a gap. In particular, the present disclosure relates to an arrangement and a sealing for limiting the intrusion of particles into a gap formed between two parts of a device, which perform a periodic motion such as a reciprocating motion relative to each other, when the device is in use.

BACKGROUND

A gap formed between two parts of a device, which perform a periodic motion such as a reciprocating motion relative to each other, may allow particles to enter into the device and get stuck between device parts, thereby negatively affecting the performance and lifetime of the device.

SUMMARY

The present invention is directed at an arrangement for limiting the intrusion of particles into a gap formed between a first part of a device and a second part of the device, wherein the second part is to perform a periodic motion relative to the first part when the device is in use, a self-cleaning sealing for limiting a depth up to which particles intrude into a gap formed between a first part of a device and a second part of the device, wherein the second part is to perform a reciprocating motion relative to the first part when the device is in use, and a method of removing particles from a gap formed between a first part of a device and a second part of the device.

In this regard, the term "periodic motion", as used throughout the description and the claims, particularly refers to a motion along a closed curve (in a coordinate system that is static with regard to either the first or second part) such as, for example, a reciprocating motion. Moreover, the formulation "when the device is in use", as used throughout the description and the claims, particularly refers to a usage scenario in which a force is applied to the first part and/or to the second part, wherein the force drives the relative motion. The force may, for instance, be applied by an electromechanical apparatus such as a motor or may be caused by manual intervention of an operator or in any other manner. For example, the first and second parts may form a bearing that connects two elements of a machine or mechanism (e.g., a joint of a robot, an artificial/a prosthetic joint for an animal/a human, a hinge for a lid or a door, etc.).

Furthermore, the term "self-cleaning sealing", as used throughout the description and the claims, particularly refers to a structure which is configured to remove particles from inside a gap that is protected by the sealing. Preferably, removing particles by the sealing according to the invention is provided when the device is in use.

The arrangement comprises a structured surface which is configured to delimit the gap towards the first part and a flexible structure which is configured to be attached to the second part and to extend into the gap, wherein a cross-section of the structured surface along a path of motion of the flexible structure has an asymmetric profile featuring a multitude of first slopes facing an intrusion direction and a multitude of gentler second slopes facing a particle removal direction.

In this regard, the term "structured surface", as used throughout the description and the claims, particularly refers to a surface with one or more groups of raised portions of equal shape and/or of recessed portions of equal shape that form a pattern, preferably a periodic pattern. For example, the structured surface may comprise a series of structures, particularly a series of raised portions (or barriers)/of recessed portions of equal shape, arranged along the intrusion direction. However, the invention is not limited to an arrangement comprising one or more groups of structures/raised portions/of recessed portions of equal shape. In some embodiments, the shape may deviate/vary within at least one of said groups. In other words, at least one of said groups may comprise structures/raised portions/recessed portions with different shapes/contours. Furthermore, a shape of the structures/raised portions/recessed portions comprised in a first group of said groups and a shape of the structures/raised portions/recessed portions comprised in a second group of said groups may deviate/vary. Moreover, the formulation "delimiting the gap towards the first part", as used throughout the description and the claims, particularly refers to a gap formed between the structured surface and a surface of the second part.

Furthermore, the term "gap", as used throughout the description and the claims, particularly refers to a clearance between the first part and the second part, wherein a space between the parts has a substantially constant height. For example, the first part may have a substantially flat surface which is parallel to, and faces, a substantially flat surface of the second part, such that the space between the surfaces has a substantially constant height. The height of the gap at a particular point on the structured surface could then be determined by subtracting the thickness of the material layer from which the structured surface is formed, from said (constant) height of said space. Notably, the material of the material layer may be different from the material from which the first part is made. For instance, the first part may be made of metal and the material layer (i.e. the structures/raised portions/recessed portions) may be made of plastic. The structured surface may also be formed by structuring a surface of the first part. Especially in this case, the material layer (i.e., the structures) and the first part may be made from the same material. In some embodiments, the surface of the first part facing the gap/the second part may be or may comprise the structured surface. In other words, the first part and the structures may be formed in one piece, whereas in other embodiments the structured surface may be formed by attaching/arranging structures to/on the surface of the first part (for example, by gluing or welding). I.e., the structures may be manufactured separately/independently from the first part (for example, by an additive manufacturing process or casting/molding) and may then be attached to/arranged on the surface of the first part such as to form the structured surface.

Moreover, the term "flexible structure", as used throughout the description and the claims, particularly refers to a structure at least partially made of a flexible material. The flexible material may provide for a bending (rather than for a breaking) of the flexible structure when coming into contact with the structured surface (e.g., a bristle made of polyamid). For instance, the flexible structure may be deflected by raised portions of the structured surface and dive into recessed portions of the structured surface to remove particles which accumulate in the recessed portions from the gap. Furthermore, the formulation "attached to the second part", as used throughout the description and the claims, particularly refers to a scenario in which the flexible structure and the second part are independently manufactured and the flexible structure is affixed to the second part. However, the flexible structure and the second part may also be formed in a single production step, possibly in one piece.

Furthermore, the formulation "a cross-section of the structured surface along a path of motion of the flexible structure", as used throughout the description and the claims, particularly refers to a cross-section which is coplanar with the path or a tangent to the path. Moreover, the term "profile", as used throughout the description and the claims, particularly refers to the contour of the cross-section towards the gap. In this regard, the term "asymmetric", as used throughout the description and the claims, particularly refers to a profile which is not mirror-symmetric.

Moreover, the term "slope", as used throughout the description and the claims, particularly refers to a section of the profile in which the height of the gap (e.g., the distance between the surface of the second element and the point on the structured surface, measured in a direction perpendicular to the surface of the second element or to a tangent to the surface of the second element) either increases or decreases when travelling in one direction across the section. In addition, the formulation "facing a direction", as used throughout the description and the claims, particularly refers to a slope which is in line of sight before it is reached when travelling along the direction on the structured surface.

Furthermore, the term "intrusion direction", as used throughout the description and the claims, particularly refers to a direction perpendicular to a plane defined by the gap edges (on an entry side) or by tangents to the gap edges. Moreover, the term "removal direction", as used throughout the description and the claims, particularly refers to a direction opposite to the intrusion direction.

The term "gentler second slopes", as used throughout the description and the claims, particularly means that the second slopes are less steep than the first slopes.

The asymmetry of the profile makes it relatively more likely that a particle is swept towards the entry side of the gap than towards the opposite direction. Hence, the arrangement prevents particles from entering deeper into the gap and is also configured to clean the gap from particles.

Each of said first slopes may extend from a local minimum to a local maximum of the asymmetric profile. In this regard, the terms "local minimum" and "local maximum", as used throughout the description and the claims, particularly refer to a "local maximum" and a "local minimum" of the height of the gap.

Each of said second slopes may extend from a local minimum to a local maximum of the asymmetric profile.

Said first slopes and said second slopes may occur in alternation along the path of motion.

For example, along the path of motion (in the particle removal direction), a particle may be going up a second slope, down a first slope, up a second slope, down a first slope, etc. As the second slopes are less steep than the first slopes, it may likely be easier for particles to travel in the particle removal direction than in the intrusion direction where the particles must go up the steeper first slopes.

The first slopes may be straight.
The second slopes may be straight.

The term "straight slope", as used throughout the description and the claims, particularly means that the inclination/gradient of the slope is constant and does not vary when travelling along the slope.

For example, a pair of consecutive first and second slopes may form two sides of a triangle.

The first slopes may be parallel to each other. The second slopes may be parallel to each other. Moreover, a surface of the first part may be even.

A contour of the flexible structure may decrease in width towards the structure's distal end.

In this regard, the term "distal end", as used throughout the description and the claims, particularly refers to the end of the structure on the side opposite to the side/end with which the structure is (to be) attached to the second part.

The flexible structure may have a central portion which extends along a longitudinal axis of the flexible structure and multiple branches defining the width of the flexible structure.

In this regard, the term "branch", as used throughout the description and the claims, particularly refers to a lengthy element extending from the central portion, particularly along a direction comprising a component extending radial/perpendicular to the longitudinal axis of the flexible structure.

The flexible structure may have a tree-like shape.

In this regard, the term "tree-like shape", as used throughout the description and the claims, particularly refers to a shape defined by a central portion and branches extending from the central portion substantially uniformly in all directions, wherein a length of the branches decreases towards the top (i.e., the distal end) of the central portion.

The flexible structure may have a conical shape. The conical shape may be advantageous in that the distal end is more flexible than the proximal end and thus causes less friction when coming into contact with the structured surface and dives deeper into recesses of the structured surface.

Said first and second slopes may meet pairwise at ridges of the structured surface.

In this regard, the term "ridge", as used throughout the description and the claims, particularly refers to a raised structure along a line defined by local maxima of profiles of parallel cross-sections of the structured surface.

The ridges may be parallel to a plane or a straight line. The ridges may be equally spaced apart.

The ridges may extend substantially perpendicular to the path of motion.

Hence, the ridges may constitute a series of barriers for particles that are about to intrude into the gap.

The arrangement may be comprised in a system that also comprises the device.

The sealing comprises a plurality of barriers which are configured to delimit the gap towards the first part and a plurality of flexible structures which are configured to be attached to the second part and to push the particles past the barriers when the second part performs the reciprocating motion relative to the first part, wherein an asymmetry of the barriers makes it relatively more likely that a particle is swept towards an entry side of the gap than towards an opposite direction.

The sealing may be comprised in a system that also comprises the device.

The method comprises attaching a flexible structure to the second part and causing a periodic motion of the second part relative to the first part, wherein the periodic motion of the second part relative to the first part causes the flexible structure to travel back and forth between, and dive into, asymmetric valleys formed on the surface of the first part and to transport particles, particularly particles located within the valleys, along a removal path towards an outlet (i.e. towards the entry side).

The ascending portions of the removal path may be less steep (relative to the direction of motion of the flexible structure) than the descending portions of the removal path.

Notably, the features of the method may be features of the arrangement or the sealing, the features of the arrangement may be features of the sealing or the method, and the features of the sealing may be features of the arrangement or the method.

BRIEF DESCRIPTION OF THE DRAWINGS

The foregoing aspects and many of the attendant advantages will become more readily appreciated as the same become better understood by reference to the following description of embodiments, when taken in conjunction with the accompanying drawings, wherein like reference numerals refer to like parts throughout the various views, unless otherwise specified.

Notably, the drawings are not drawn to scale and unless otherwise indicated, they are merely intended to conceptually illustrate the structures and procedures described herein.

DESCRIPTION OF EMBODIMENTS

Figure 1A:
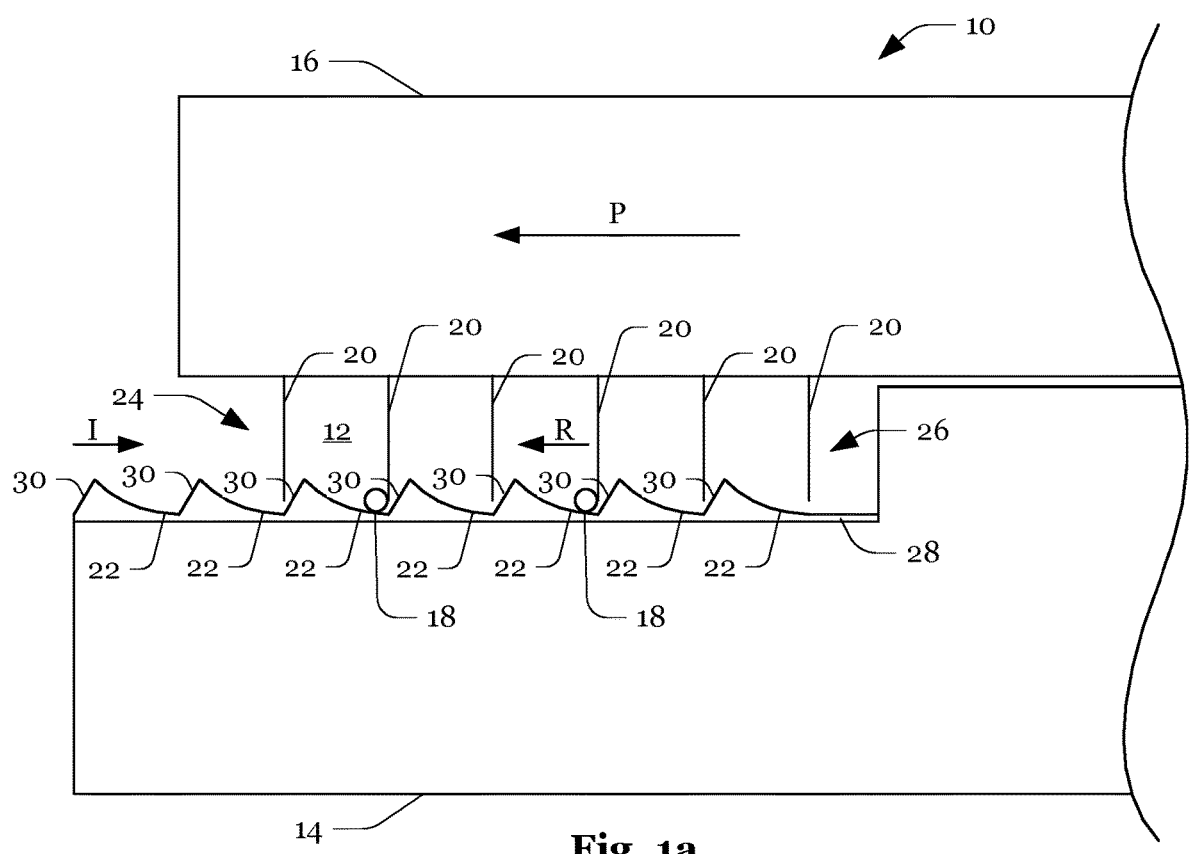
FIG. 1a and FIG. 1b show schematic cross-sectional views of a portion of the device and the gap formed between the first part and the second part of the device, according to an exemplary embodiment.
Figure 1B:
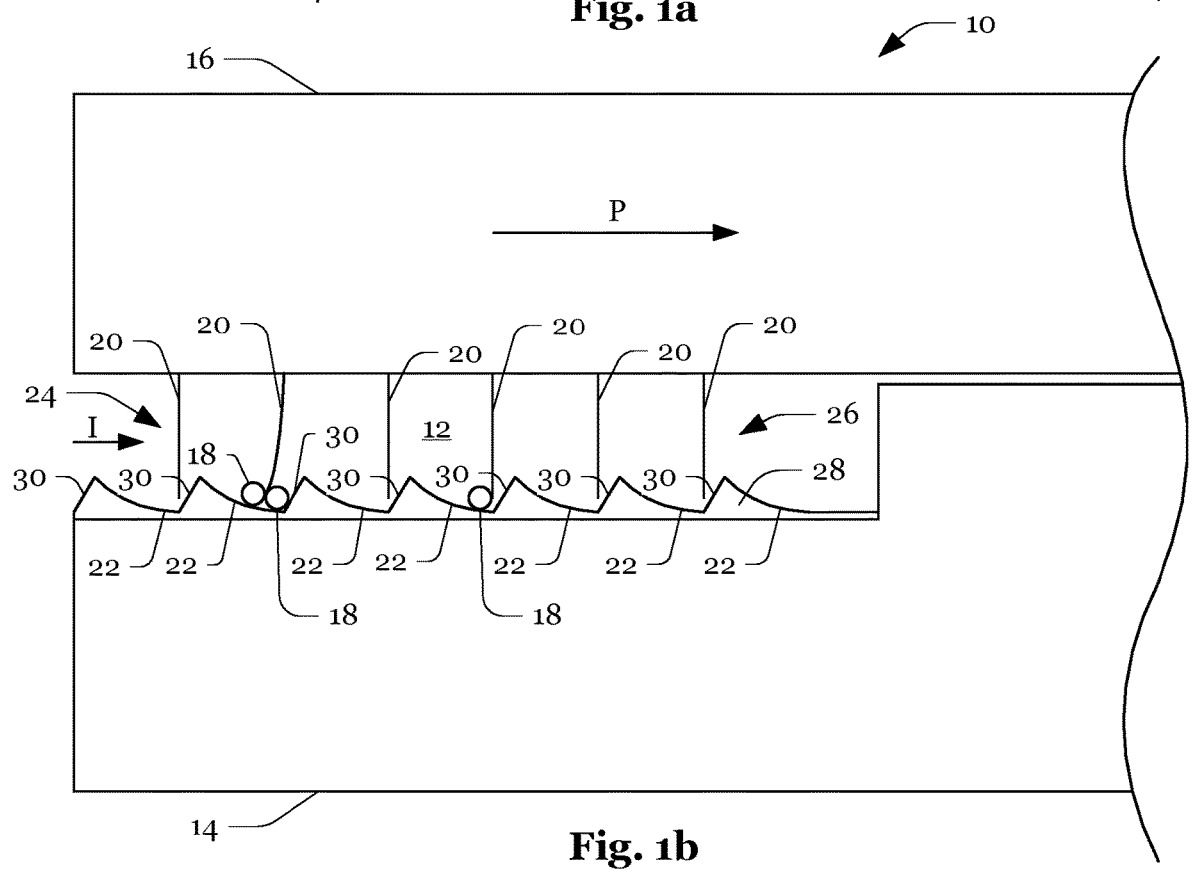

FIG. 1a and FIG. 1b show schematic cross-sectional views of a portion of device 10 as well as gap 12 formed between first part 14 and second part 16 of device 10. When in use, second part 16 performs a periodic motion relative to first part 14. The periodic motion includes a back-and-forth component (indicated by arrow P) which is parallel to the intrusion direction (indicated by arrow I). The periodic motion may be a two-dimensional periodic motion or a one-dimensional periodic motion and may be caused by an actuator (not shown) or through manual intervention by an operator (or for any other reason).

When second part 16 moves relative to first part 14 in the particle removal direction (indicated by arrow R in FIG. 1a), particles 18 are pushed by flexible structures 20 up second slopes 22 and past the barriers (which are caused by asymmetric profile 24 of structured surface 26). Structured surface 26 may be formed by material layer 28 which may be made of a different material than first part 14 and may have been attached to first part 14 during manufacture of device 10. For example, the barriers may be made of a durable material that can be easily processed (such as a thermoplastic) to reduce the effort required to produce asymmetric profile 24. Alternatively, the barriers and first part 14 may be made from the same material (e.g., metal).

When second part 16 moves relative to first part 14 in intrusion direction I as illustrated in FIG. 1b, particles 18 are pushed (by flexible structures 20) against relatively steeper first slopes 30 of the barriers. This may cause (or rather make it likely) that flexible structures 20 bend and slip over, or around, particles 18. If flexible structures 20 bend and slip over, or around, particles 18, said particles 18 are not transported along intrusion direction I. As a result, the periodic motion causes (on average) particles 18 to be transported towards the outlet. In other words, asymmetric profile 24 of structured surface 26 (which features a multitude of steep first slopes 30 facing intrusion direction I and a multitude of gentler second slopes 22 facing particle removal direction R) causes the sealing between first part 14 and second part 16 to be self-cleaning.

Figure 2:
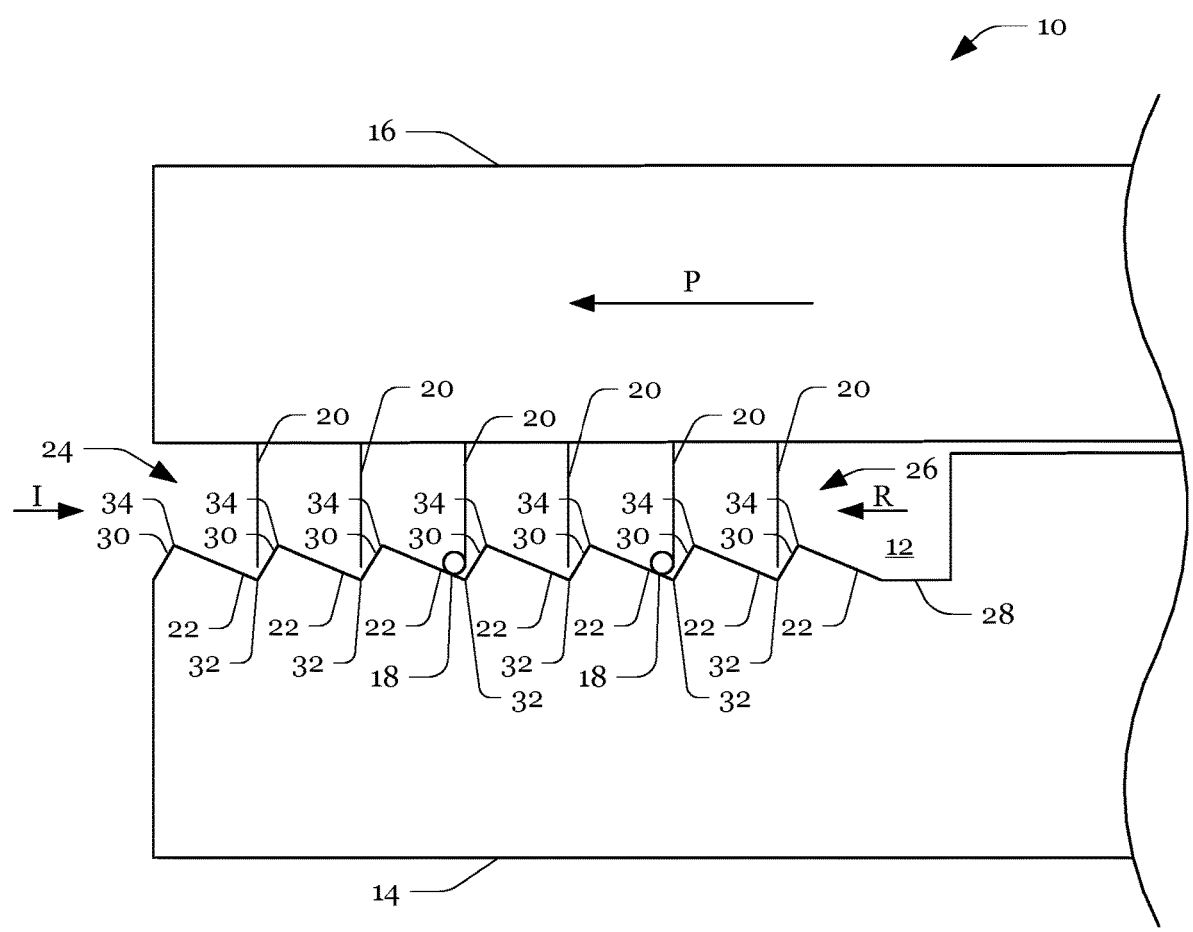
FIG. 2 illustrates a possible modification of the exemplary embodiment shown in FIG. 1.

FIG. 2 illustrates a possible modification of asymmetric profile 24 in which second slopes 22 and first slopes 30 are straight and extend from local minima 32 to local maxima 34 of asymmetric profile 24 (whereas asymmetric profiles 24 shown in FIG. 1a and FIG. 1b have concave second slopes 22 and straight first slopes 30). Local minima 32 are equidistantly spaced apart. Local maxima 34 are equidistantly spaced apart. However, local minima 32 and local maxima 34 are not equidistantly spaced. Rather, a distance between one of local minima 32 and one of local maxima 34 that define one of first slopes 30 is smaller than a distance between one of local minima 32 and one of local maxima 34 that define one of second slopes 22. In other words, gentler second slopes 22 are (substantially) shorter than steeper first slopes 30.

Figure 3:
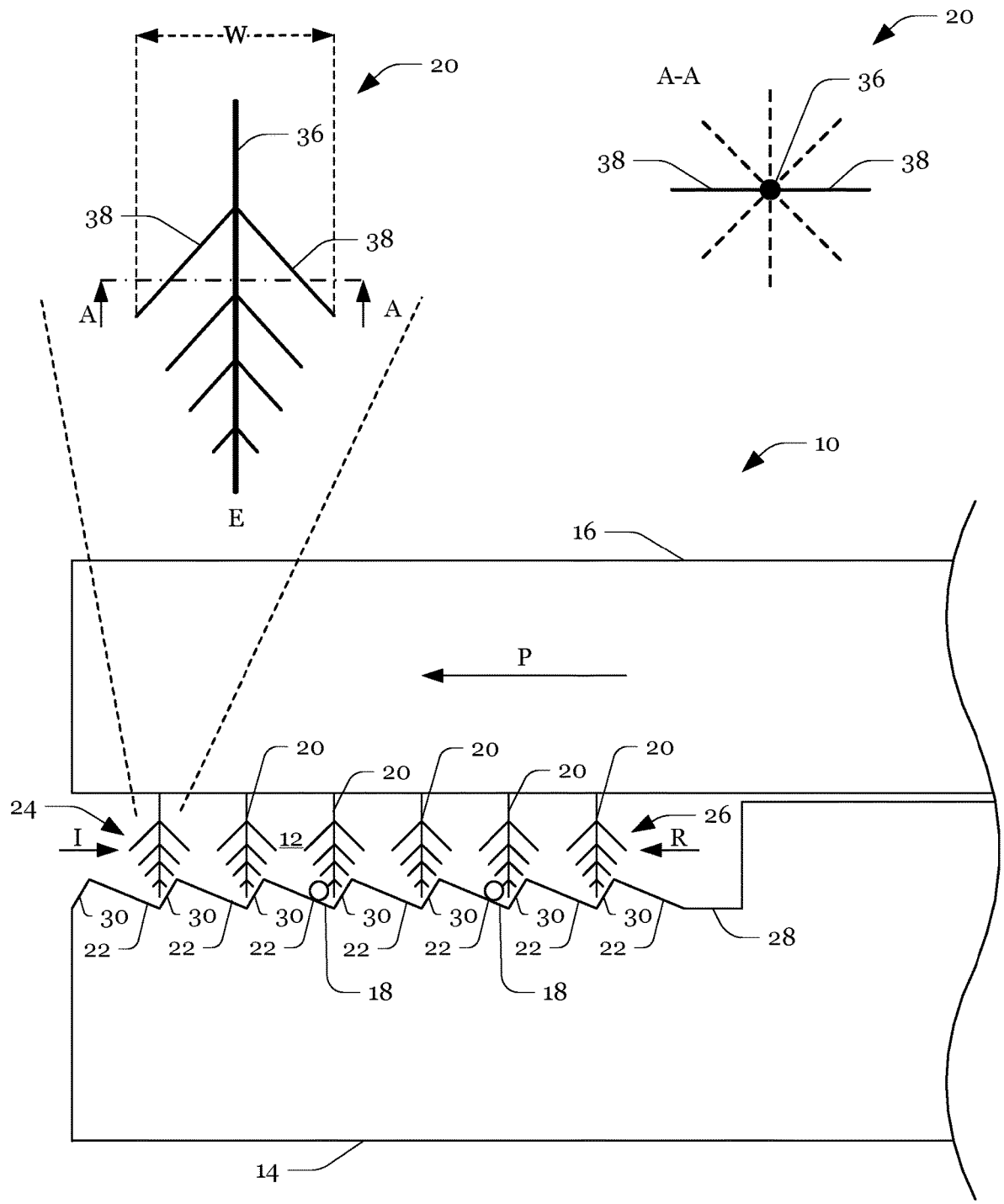
FIG. 3 illustrates a possible modification of the exemplary embodiments shown in FIG. 1 and FIG. 2 (using the exemplary embodiment shown in FIG. 2 as an example).

FIG. 3 illustrates a possible modification of flexible structure 20. There, flexible structure 20 comprises (not only) portion 36 which extends along a longitudinal axis of flexible structure 20 but also multiple branches 38 (with optional branches being indicated by broken lines) extending from central portion 36 laterally and defining a width of flexible structure 20 (indicated by arrow W). Central portion 36 may have a cylindrical shape and may be made of a (durable and) flexible material such as Polyamide (or another durable and flexible plastic). Central portion 36 dives into the valleys formed between the local maxima 34 of asymmetric profile 24 but does not reach local minima 32 of asymmetric profile 24.

Branches 38 may also have a cylindrical shape and may be made of the same material as central portion 36. The angles between the longitudinal axis of flexible structure 20 and branches 38 may be between 30° and 60° and/or all branches 38 may be inclined relative to said longitudinal axis by (substantially) the same angle. However, the length may differ between different ones of branches 38. For example, as shown in FIG. 3, a length of branches 38 may decrease towards the free end of central portion 36. As a result, width W of flexible structure 20 may decrease towards distal end E of flexible structure 20.

Figure 4:
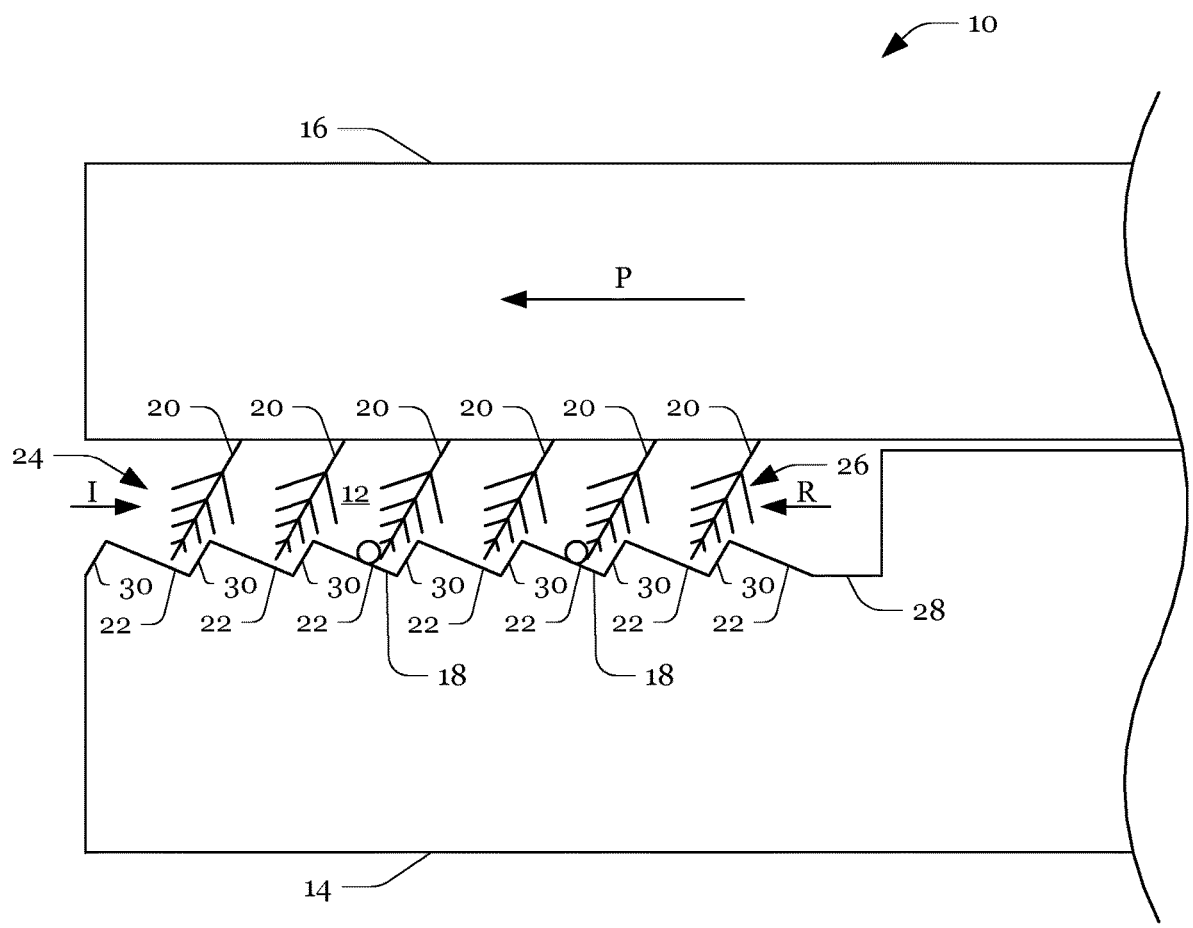
FIG. 4 illustrates a possible modification of the exemplary embodiments shown in FIG. 1, FIG. 2, and FIG. 3 (using the exemplary embodiment shown in FIG. 3 as an example).

FIG. 4 illustrates a possible modification in which central portions 36 are not arranged perpendicular to the surface of second part 16 as shown in FIG. 3, but (substantially) parallel to first slopes 30. For example, first slopes 30 (and central portions 36) may be inclined by 30° to 60° (relative to the plane along, or in which, second part 16 moves). An inclination of second slopes 22 may be 15° or less than the inclination of first slopes 30.

Figure 5:
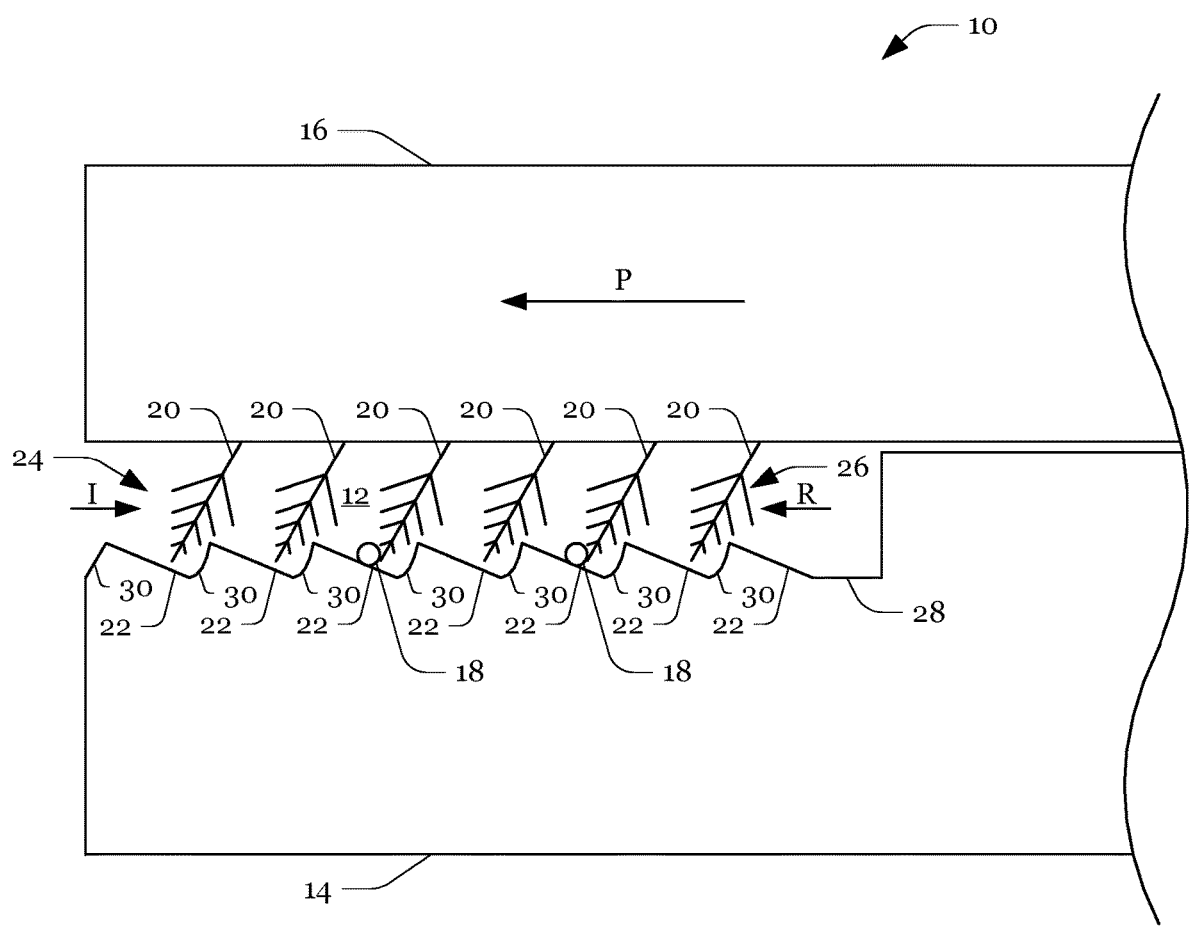
FIG. 5 illustrates a possible modification of the exemplary embodiments shown in FIG. 1, FIG. 2, FIG. 3, and FIG. 4 (using the exemplary embodiment shown in FIG. 4 as an example).

FIG. 5 illustrates a possible modification of asymmetric profile 24 in which first slopes 30 are curved (whereas asymmetric profile 24 shown in FIG. 4 has straight first slopes 30 which extend from local minima 32 to local maxima 34 of asymmetric profile 24). Curved first slopes 30 may increase the resistance of the barriers to the intrusion of particles 18 when second part 16 moves relative to first part 14 in intrusion direction I as flexible structures 20 may (purposefully) fail to push particles 18 past the steepest portions of curved first slopes 30. Notably, if both, first slopes 30 and second slopes 22 are curved, their steepness ranges may overlap. But first slopes 30 may nevertheless have a portion which is steeper than any portion of second slopes 22 such that second slopes 22 may still be gentler.

Figure 6:
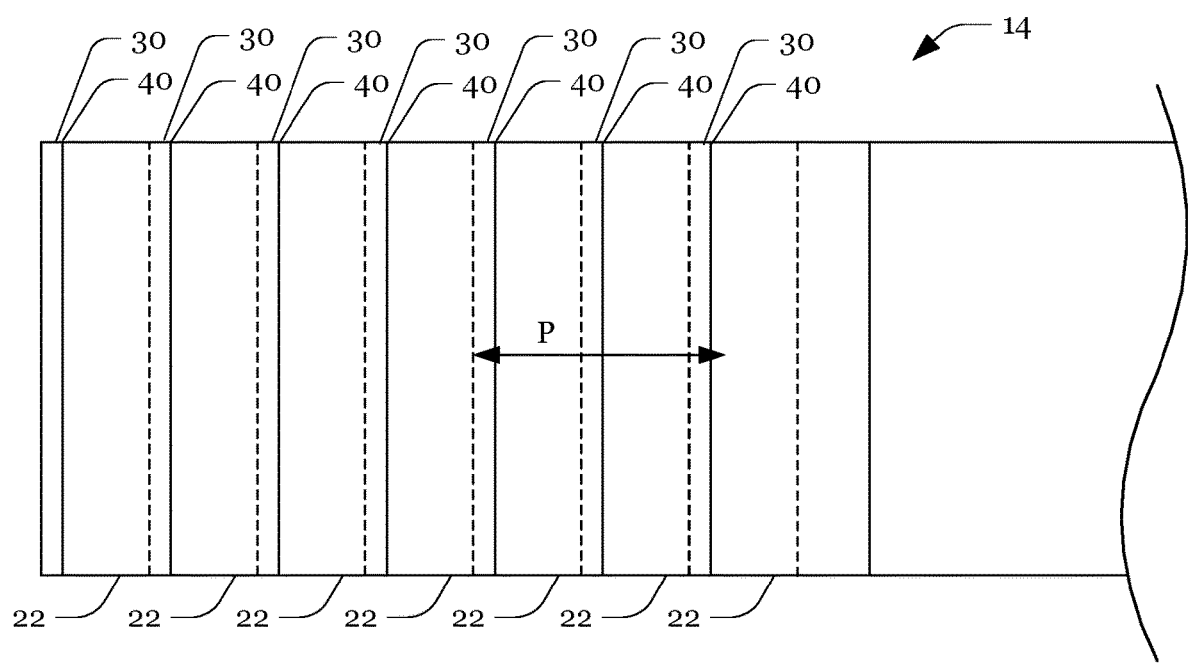
FIG. 6 shows a schematic top view of the first part shown in FIG. 1, FIG. 2, FIG. 3, and FIG. 4, according to an exemplary embodiment.
Figure 7:
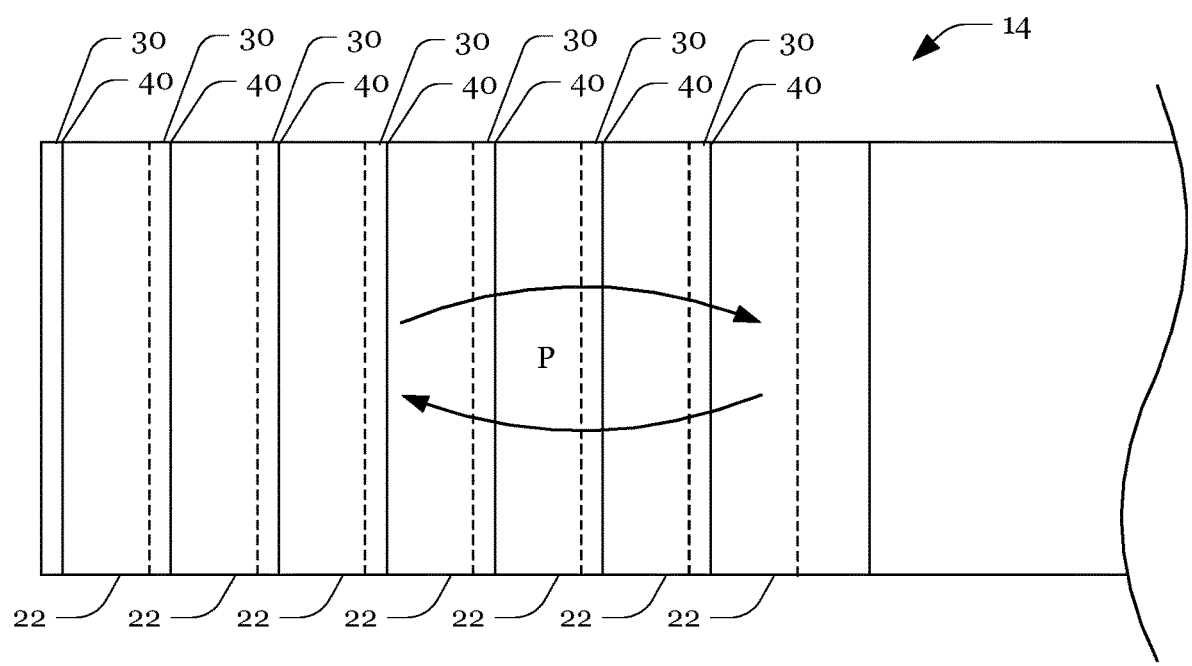
FIG. 7 illustrates a possible modification of the exemplary embodiment shown in FIG. 6.

FIG. 6 and FIG. 7 show schematic top views of first part 14 and illustrate possible periodic motions of second part 16 (not shown) relative to first part 14 (indicated by arrow P). In FIG. 6, periodic motion P is a one-dimensional motion along an axis that is perpendicular to ridges 40 (at which pairs of second and first slopes 22 and 30 meet and which separate the asymmetric valleys). In FIG. 7, periodic motion P is a two-dimensional motion along a path that has a component which is perpendicular to ridges 40. Ridges 40 shown in FIG. 6 and FIG. 7 are straight but may also consist of a multitude of straight segments or may be curved. Moreover, asymmetric profile 24 may be rounded around ridges 40 to reduce wear and tear of flexible structures 20.

Figure 8:
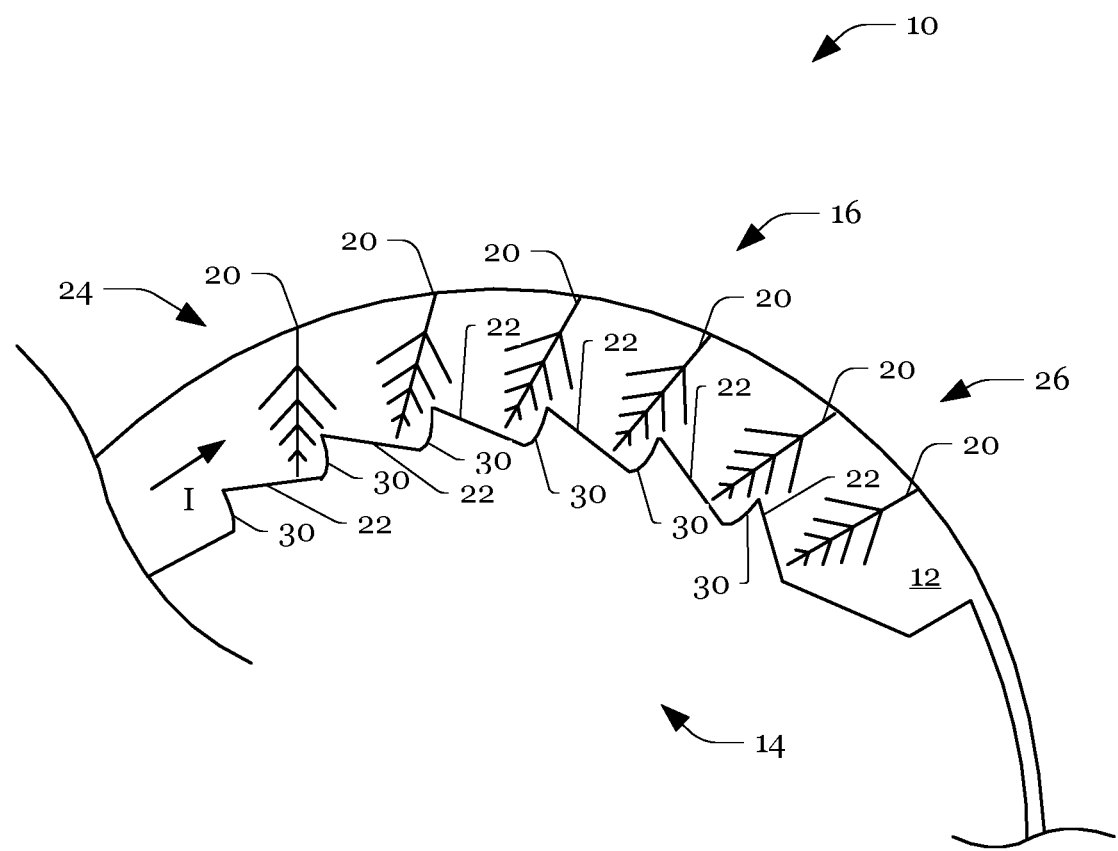
FIG. 8 illustrates another possible modification of the exemplary embodiments shown in FIG. 1, FIG. 2, FIG. 3, and FIG. 4 (using the exemplary embodiment shown in FIG. 4 as an example).

FIG. 8 illustrates another possible modification in which the surfaces of first part 14 and second part 16 are curved (e.g., round). Here, the steepness of second and first slopes 22 and 30 relative to the motion of the corresponding flexible structure 20 may be chosen such that steeper first slopes 30 face intrusion direction I.

Figure 9:
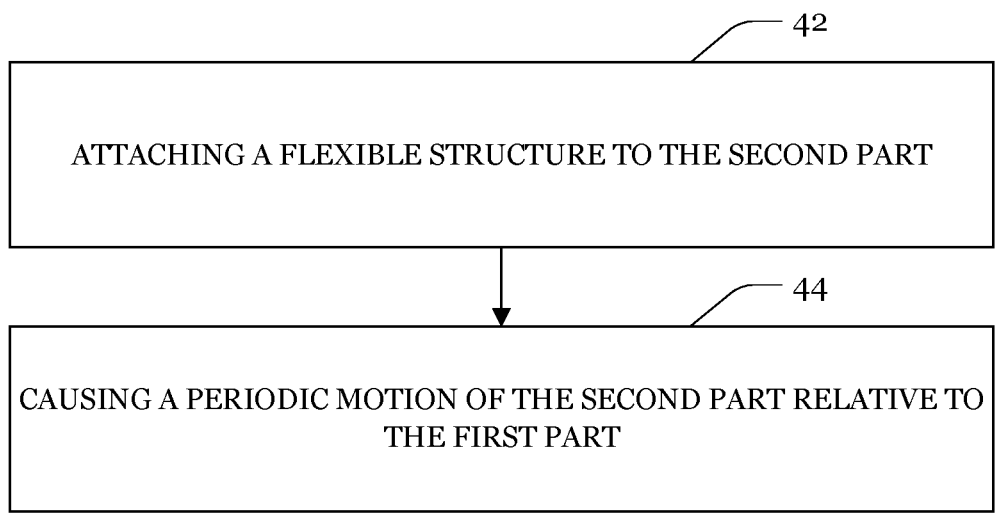
FIG. 9 shows a flow-chart of the steps employed for removing particles from the gap formed between the first part and the second part of the device.

FIG. 9 shows a flow-chart of the steps employed for removing particles 18 from gap 12 formed between first part 14 and second part 16 of device 10. At step 42, a flexible structure 20 is attached to second part 16. Then, at step 44, a periodic motion of second part 16 relative to first part 14 is caused. The periodic motion of second part 16 relative to first part 14 causes flexible structure 20 to travel back and forth between, and dive into, the asymmetric valleys formed on the surface of first part 14 and to transport particles 18 within the valleys along a removal path to an outlet. The ascending portions of the removal path may be less steep (relative to the direction of motion of the flexible structure 20) than the descending portions of the removal path.

REFERENCE SIGNS LIST 10 device
12 gap
14 first part
16 second part
18 particles
20 flexible structure
22 second slope
24 asymmetric profile
26 structured surface
28 material layer
30 first slope
32 local minimum
34 local maximum
36 central portion
38 branch
40 ridges
42 step
44 step

The invention claimed is:

1. An arrangement for limiting the intrusion of particles into a gap of a device, comprising:
a first part having a structured surface extending between a first end and opposing second end, the structured surface comprising a plurality of outwardly projecting barriers that are disposed at spaced locations between the first end and the second end, each of the plurality of barriers having an asymmetric profile that includes a first slope facing toward the first end and an opposing second slope facing toward the second end, the second slope being more gentle than the first slope;
a second part having an interior surface that at least partially overlays the structured surface of the first part, the gap being formed between the interior surface of the second part and the structured surface of the first part, the second part reciprocating relative to the first part along a path of motion during a use of the device; and
a plurality of flexible structures each attached to the second part so as to project into the gap toward the structured surface of the first part, each of the plurality of flexible structures being spaced apart along a length of the interior surface of the second part, wherein the plurality of flexible structures are configured to push particles located within the gap past the barriers toward an entry end of the gap when the second part is reciprocating relative to the first part.

2. The arrangement of claim 1, wherein the first slope of each barrier extends from a local minimum to a local maximum of the asymmetric profile and/or the second slope of each barrier extends from a local minimum to a local maximum of the asymmetric profile.

3. The arrangement of claim 1, wherein the first slope of each barrier and the second slope of each barrier occur in alternation along the path of motion.

4. The arrangement of claim 1, wherein the first slope and/or the second slope of each barrier is linear.

5. The arrangement of claim 4, wherein the first slopes are parallel to each other and/or the second slopes are parallel to each other.

6. The arrangement of claim 1, wherein the flexible structure has a contour that decreases in width towards a distal end thereof.

7. The arrangement of claim 6, wherein the flexible structure has a central portion which extends along a longitudinal axis and a multiple branches outwardly projecting from the central portion.

8. The arrangement of claim 7, wherein the flexible structure has a tree-like shape.

9. The arrangement of claim 1, wherein the flexible structure has a conical shape.

10. The arrangement of claim 1, wherein the first slope and the second slope of each barrier meet together at a corresponding ridge of the structured surface.

11. The arrangement of claim 10, wherein the ridge of each barrier is parallel to a plane or a straight line.

12. The arrangement of claim 10, wherein the ridge of each barrier extends substantially perpendicular to the path of motion.

13. A self-cleaning sealing which is configured to limit a depth up to which particles intrude into a gap of a device, comprising:

a first part having a structured surface extending between a first end and opposing second end, the structured surface comprising a plurality of outwardly projecting barriers that are disposed at spaced locations between the first end and the second end, each of the plurality of barriers having an asymmetric profile that includes a first slope facing toward the first end and an opposing second slope facing toward the second end, the second slope being more gentle than the first slope;

a second part having an interior surface that at least partially overlays the structured surface of the first part, the gap being formed between the interior surface of the second part and the structured surface of the first part, the second part reciprocating relative to the first part along a path of motion during a use of the device; and a plurality of flexible structures each attached to the second part so as to project into the gap toward the structured surface of the first part, each of the plurality of flexible structures being spaced apart along a length of the interior surface of the second part, wherein the plurality of flexible structures are configured to push particles located within the gap past the barriers toward an entry end of the gap when the second part is reciprocating relative to the first part.

14. A system comprising an arrangement of claim 1 and said device.

* * * * *